C. Crow,

Plow.

No. 97,609. Patented Dec. 7, 1869.

Witnesses
Harry King
J. Lehmann

Inventor
Charles Crow
per
Alexander & Mason
Attys.

N. PETERS, PHOTO-LITHOGRAPHER, WASHINGTON, D.C.

UNITED STATES PATENT OFFICE.

CHARLES CROW, OF COVINGTON, INDIANA, ASSIGNOR TO HIMSELF AND WILLIAMSON D. KERR, OF SAME PLACE.

IMPROVEMENT IN PLOWS.

Specification forming part of Letters Patent No. 97,609, dated December 7, 1869.

*To all whom it may concern:*

Be it known that I, CHAS. CROW, of Covington, in the county of Fountain, and in the State of Indiana, have invented certain new and useful Improvements in Plows; and I do hereby declare that the following is a full, clear, and exact description thereof, reference being had to the accompanying drawings, and to the letters of reference marked thereon, making a part of this specification.

The nature of my invention consists in the construction of a plow provided with two movable mold-boards, which can be moved nearer to or farther from each other, or which can be entirely taken off when desired, so that the plow may be used for either ditching or plowing.

Figure 1:
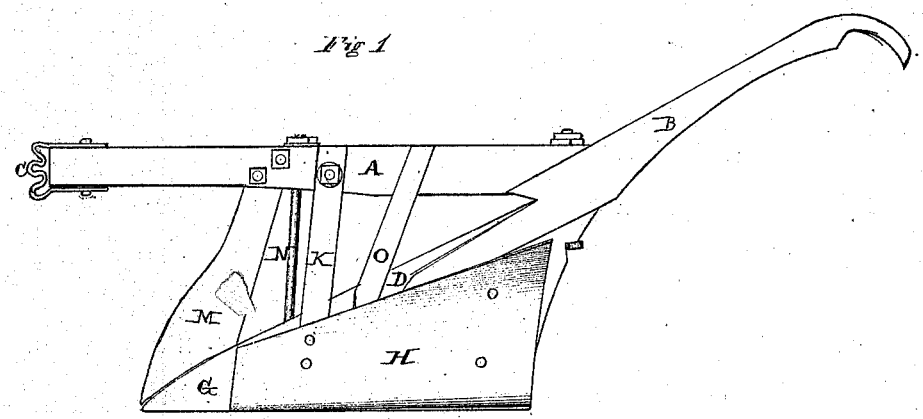
Figure 2:
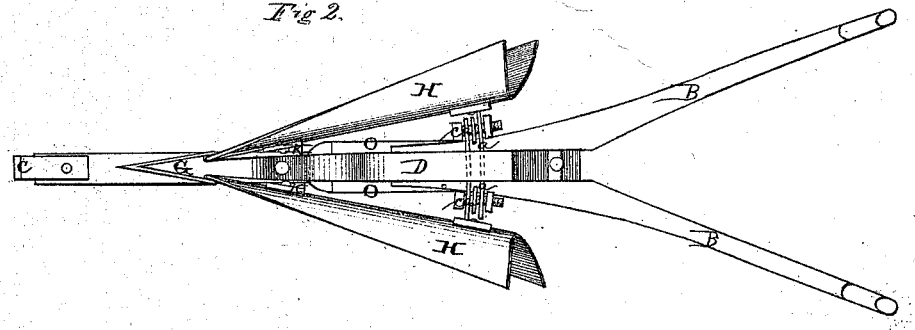
Figure 3:
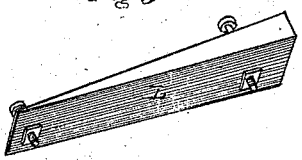

Figure 1 is a side elevation of my plow. Fig. 2 is an inverted view of the same. Fig. 3 is the landside-piece, which is attached when one of the mold-boards is removed.

Letter A represents the beam, to which the handles B and clevis C are attached. Secured to the rear end of the beam, and between the lower ends of the handles, is the sheth D, which is constructed of cast-iron, and has the steel point G attached to its front end. To each side of the plow there is secured a mold-board, H, which have their front ends fastened in grooves formed in the point G, while their rear ends are held by slotted ears a, so that they may be moved nearer to or farther from each other, as may be desired. These boards are curved outward at both top and bottom, (as seen in Fig. 2,) and are strengthened near their front ends by the braces K. The ears or slotted plates a are secured to the inner sides of the boards, and extend through the sheth, and are held at any desired point by means of the screws c. When it is desired to use the plow for ditching purposes, both of these mold-boards are used; but when used for plowing only, one of them is removed, and the tapering landside L is attached to the side of the sheth in its place by means of bolts or any suitable device. Secured to the beam, and extending downward over the share, is a cutter, M, which is used to cut roots and other obstructions which may be in the way.

N and O are braces, which are used to strengthen the sheth.

Having thus described my invention, what I claim, and desire to secure by Letters Patent, is—

1. A plow provided with two adjustable mold-boards, which may be moved nearer to or farther from each other, which may be used either as a ditcher or plow, substantially as set forth.

2. The movable landside L, when used in the manner and for the purpose described.

3. The mold-boards H, cutter M, braces K, N, and O, beam A, plates a, screws c, and sheth D, when combined to form a plow, substantially as specified.

In testimony that I claim the foregoing I have hereunto set my hand this 7th day of July, 1869.

CHARLES CROW.

Witnesses:
JOHN C. BROWN,
W. A. TIPTON.